US006213906B1

(12) United States Patent
Codatto

(10) Patent No.: US 6,213,906 B1
(45) Date of Patent: Apr. 10, 2001

(54) DEVICE FOR PIVOTING A SWINGING ARM, SUCH AS AN ARM OF A MANIPULATOR ROBOT, ABOUT A VERTICAL AXIS, AND A MANIPULATOR ROBOT INCLUDING THE DEVICE

(76) Inventor: Antonio Codatto, Via Enrico Fermi 17, I-36045, Lonigo, Vincenza (IT)

(*) Notice: Subject to any disclaimer, the term of this patent is extended or adjusted under 35 U.S.C. 154(b) by 0 days.

(21) Appl. No.: 09/446,663

(22) PCT Filed: Jun. 19, 1998

(86) PCT No.: PCT/EP98/03742

§ 371 Date: Dec. 23, 1999

§ 102(e) Date: Dec. 23, 1999

(87) PCT Pub. No.: WO98/58776

PCT Pub. Date: Dec. 30, 1998

(30) Foreign Application Priority Data

Jun. 23, 1997 (IT) ............................................. TO97A0548

(51) Int. Cl.⁷ .............................. F16H 1/32; B25J 17/00; B25J 11/00
(52) U.S. Cl. .......................... 475/178; 74/490.03; 901/25
(58) Field of Search .................................. 475/178, 179; 74/490.03; 901/23, 24, 25

(56) References Cited

U.S. PATENT DOCUMENTS

| 1,773,568 | * | 8/1930 | Braren ............................. 475/179 X |
| 4,050,331 | * | 9/1977 | Braren ................................. 475/168 |
| 4,621,543 | * | 11/1986 | Gabilondo ............................ 475/178 |
| 4,690,010 | * | 9/1987 | Matsumoto et al. ............. 475/179 X |
| 4,909,102 | * | 3/1990 | Haga ................................ 475/179 X |
| 5,046,915 | * | 9/1991 | Azuma et al. ..................... 901/25 X |
| 5,188,572 | * | 2/1993 | Yamaguchi et al. ................. 475/168 |
| 5,290,208 | * | 3/1994 | Minegishi ............................ 475/178 |
| 5,314,293 | * | 5/1994 | Carlisle et al. .................... 901/25 X |
| 5,433,672 | * | 7/1995 | Tanaka et al. ....................... 475/178 |
| 5,881,604 | * | 3/1999 | Miwa ........................... 74/490.03 X |
| 5,989,144 | * | 11/1999 | Chen et al. .......................... 475/168 |

FOREIGN PATENT DOCUMENTS

| 8623788 U | 4/1988 | (DE) . |
| 0 188 233 | 7/1986 | (EP) . |
| 59-121255 | 7/1984 | (JP) . |
| WO87 06671 | 11/1987 | (WO) . |

* cited by examiner

Primary Examiner—Charles A Marmor
Assistant Examiner—Roger Pang
(74) Attorney, Agent, or Firm—Sughrue, Mion, Zinn, Macpeak & Seas, PLLC

(57) ABSTRACT

A robot arm is supported by a pillar (14) rotatable about a vertical axis (A) and rotated by a reversible electric motor (88). The output shaft (90) of the motor (88) is connected to the pillar (14) by means of a mechanical reduction transmission which comprises a pair of planetary reduction units (62, 64). 7he driving members of both reduction units (62, 64) are fixed angularly to the output shaft (90) of the motor (88). The driven members (68, 70) of both reduction units (62, 64) are fixed angularly to the pillar (14). When the device is in operation, the peripheral rings (72, 74) of both reduction units (62, 64) are fixed to a structure (42) which supports the pillar (14). The angular position of at least one of the peripheal rings (72) is adjustable about the vertical axis (A) relative to the other ring (74) to enable the play in the internal gearings of the reduction units (62, 64) to be cancelled out.

8 Claims, 6 Drawing Sheets

DEVICE FOR PIVOTING A SWINGING ARM, SUCH AS AN ARM OF A MANIPULATOR ROBOT, ABOUT A VERTICAL AXIS, AND A MANIPULATOR ROBOT INCLUDING THE DEVICE

The present invention relates to a device for supporting and pivoting a swinging arm, such as an arm of a manipulator robot.

The invention has been devised for application to a manipulator robot which is to form part of a panelling machine, that is, a machine comprising the robot and a bending press for processing sheet-metal panels. It may, however, be used for pivoting any swinging arm having, at its free end remote from the axis of rotation, a working head which has to be positioned with maximum accuracy.

In many cases it is desirable, for gripping the panels, to have a manipulator having a manipulator head which is movable along three Cartesian axes and rotatable about these axes.

Amongst other things, a manipulator of this type would enable vertical panels to be picked up, to be arranged horizontally for bending in the press and, finally, to be placed in a vertical or inclined position in an output station.

It would also permit mechanized changing of the bending tools of the press.

The use of robots with swinging arms similar to welding robots has already been tried for this operation.

In robots of this type, the swinging of the arm is brought about by a reversible electric motor, by means of a mechanical transmission in the form of a reduction gear unit.

Figure 8:
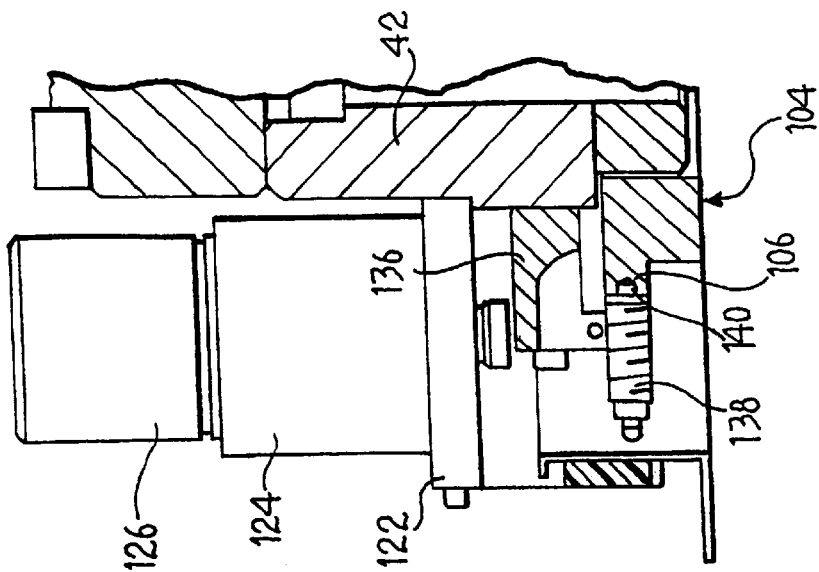

For example, document EP-A-0 188 233, more particularly on its page 23 and FIGS. 8, 9, discloses a manipulator robot.

In this known robot the swinging of the arm is brought about by a reversible electric motor, by means of a mechanical transmission which includes a primary reduction gear for reducing the rotation of the electric motor and a secondary, planetary reduction gear for further reducing the rotation of the output of the primary reduction gear.

A transmission of this type suffers from inevitable play because of which accurate positioning of a manipulator head situated at the free end of the arm is not possible.

If, for example, the play in the reduction unit is of the order of 1' of a degree, a manipulator head situated at 3 m from the axis of rotation can be positioned with an accuracy of the order of 0.9 mm, which is unacceptable.

The object of the present invention is to provide a device which, in spite of the length of the arm, ensures accurate positioning of a manipulator head or other type of head.

According to the present invention, this object is achieved by means of a device as claimed.

By virtue of the solution claimed, the drive can be transmitted from the output shaft of the electric motor to the pillar with practically zero angular play.

Document WO 87/06671 discloses a planetary gear train which includes a pair of reduction units, both of which are of the planetary type and each of which has a driving member, a driven member, a fixed peripheral ring, and internal gearing.

The angular position of one of the peripheral rings is adjustable about the axis of the gear train relative to the other ring to enable the play in the internal gearing of the reduction units to be cancelled out.

As will be understood further from the description with reference to the drawings, amongst other things, the device claimed enables a robot with a swinging arm to be used as a manipulator robot in a numerically-controlled panelling machine.

The invention also relates to a manipulator robot including the device claimed.

Figure 1:
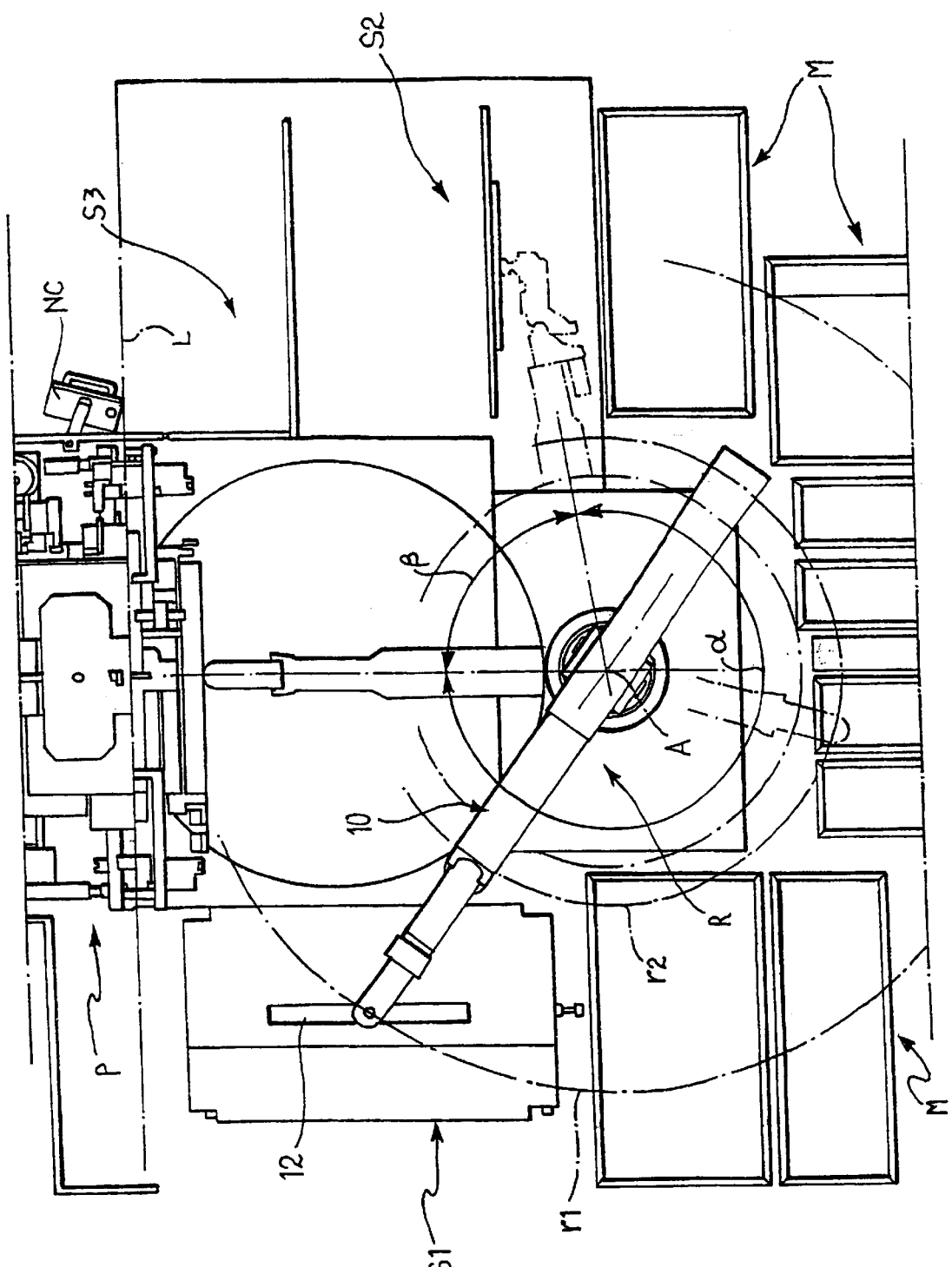
Figure 2:
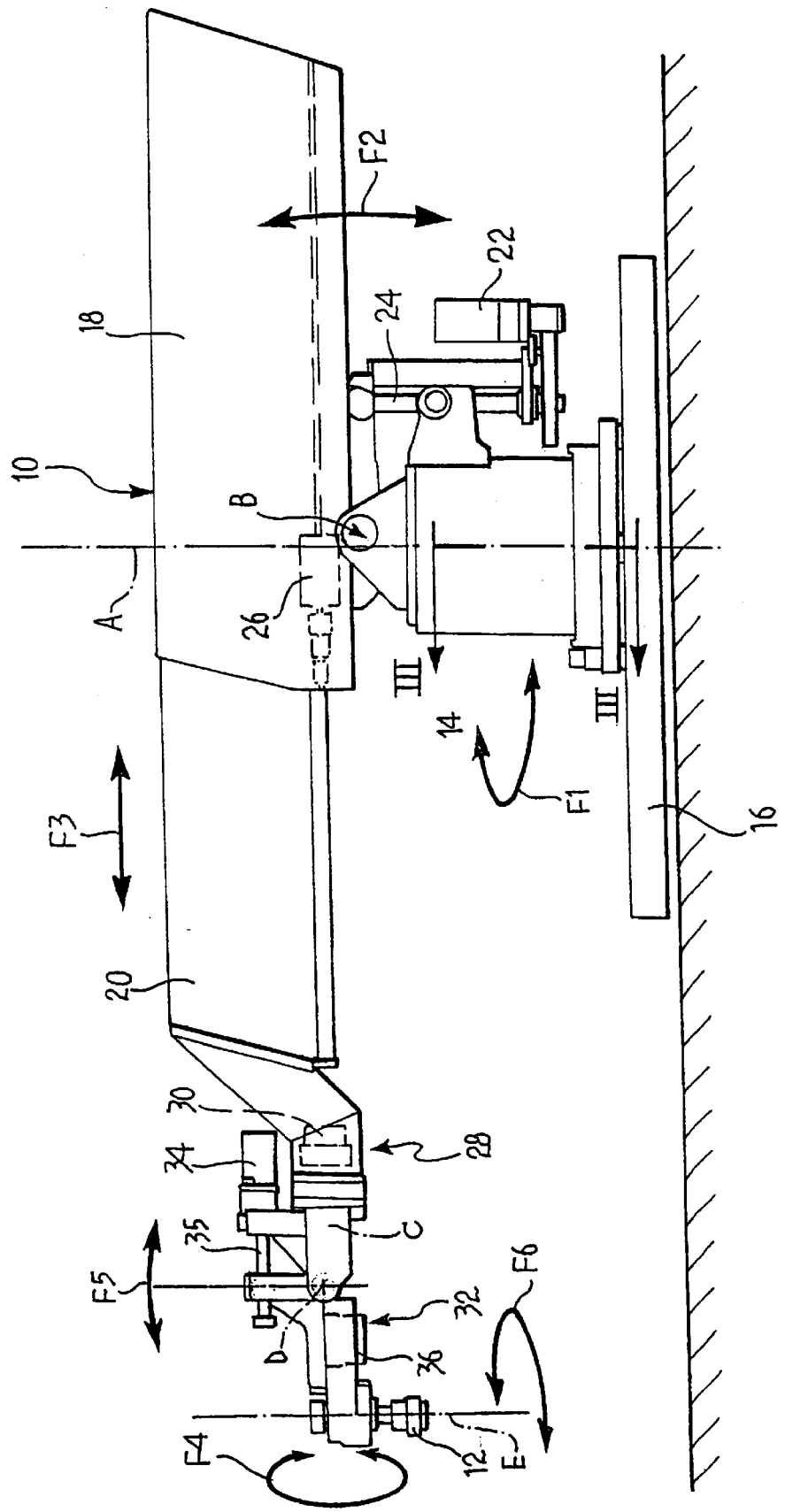
Figure 3:
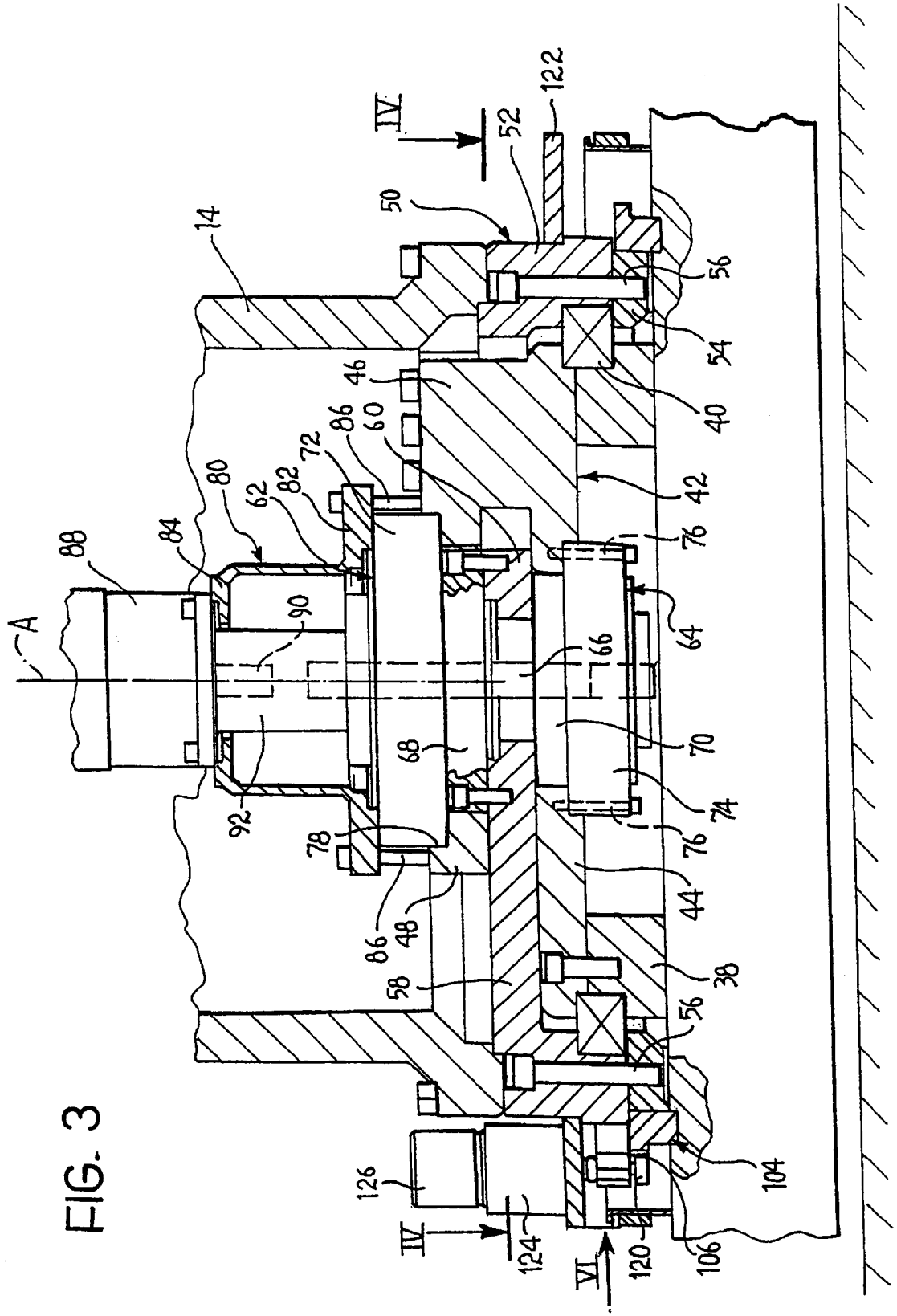
Figure 4:
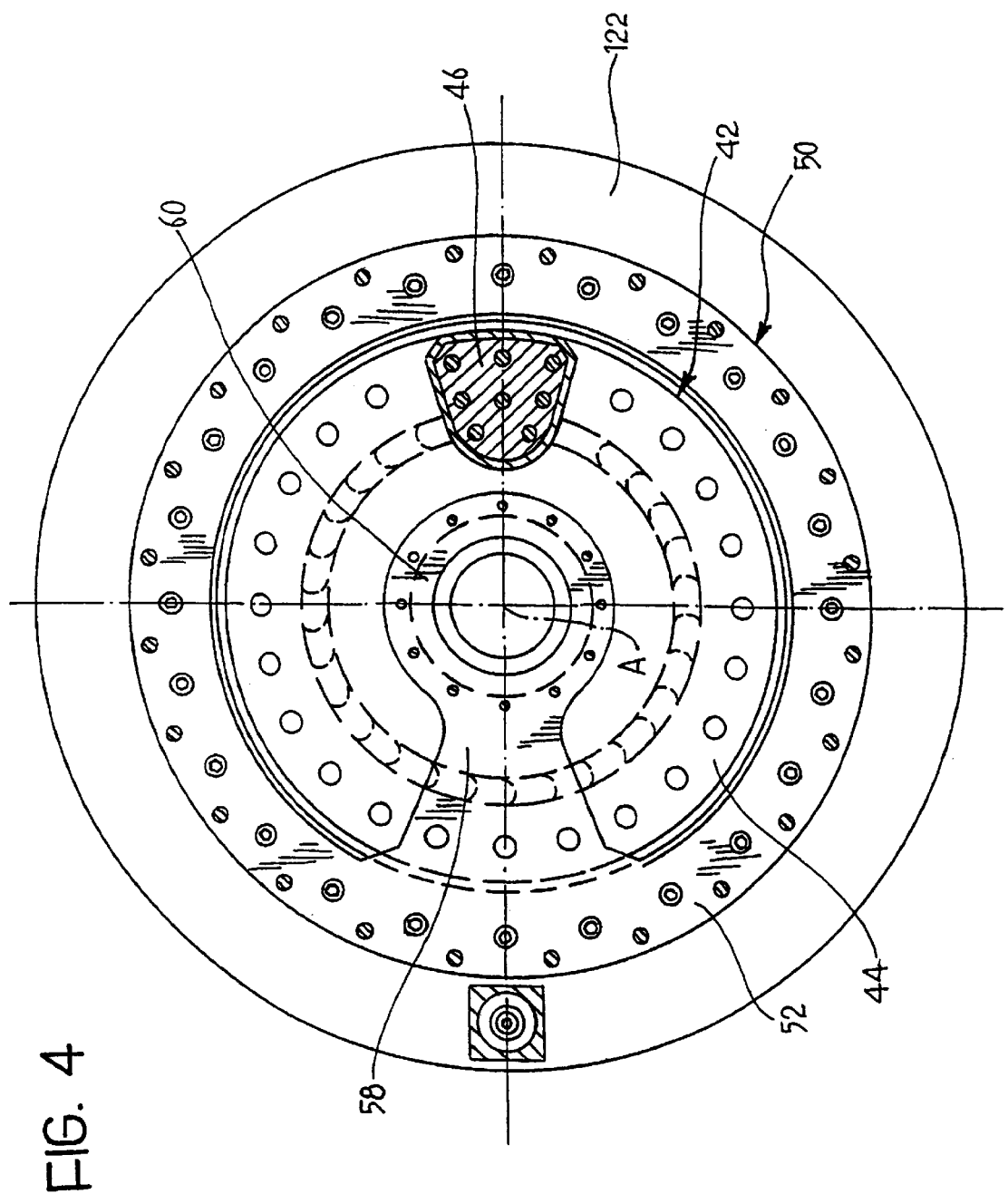
Figure 6:
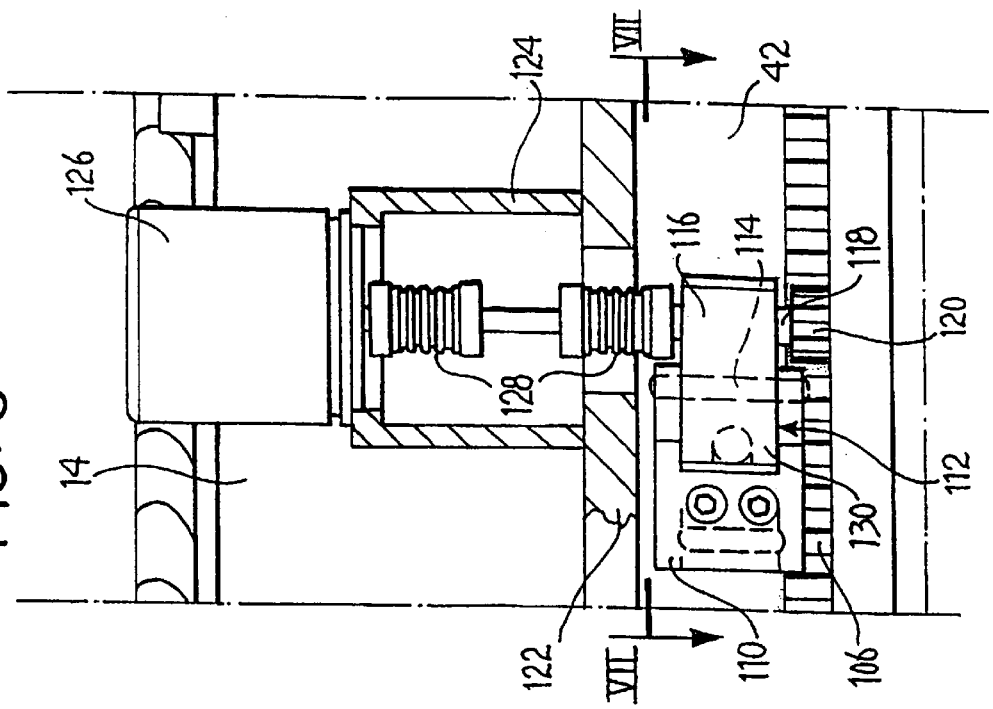
Figure 5:
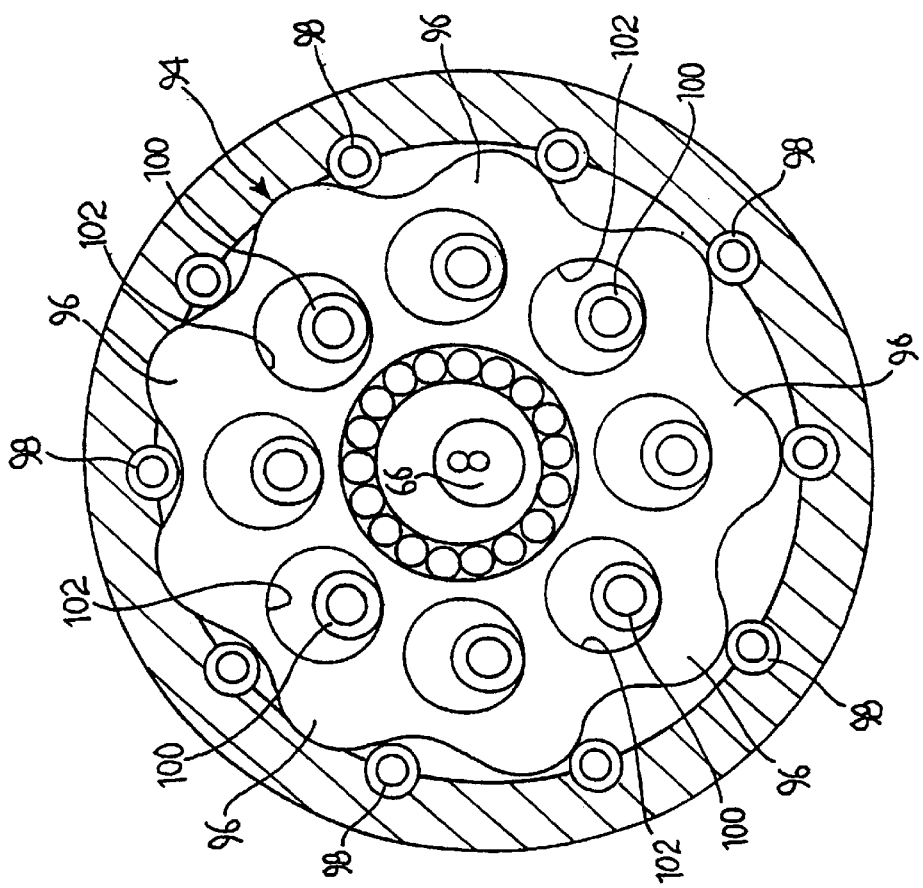
Figure 7:
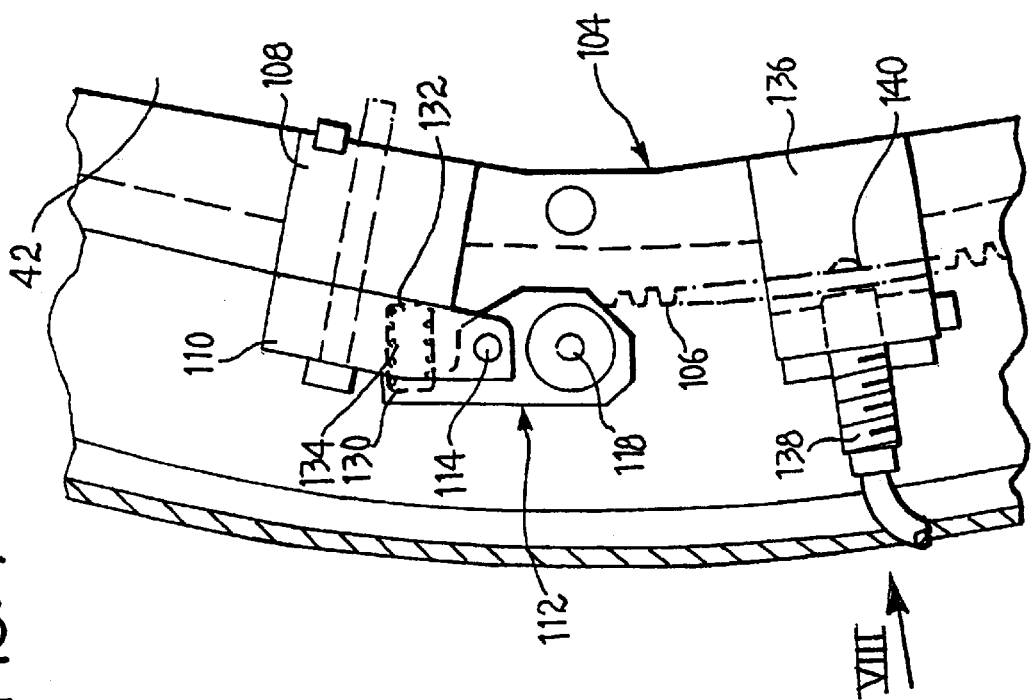

The invention will be understood better from a reading of the following detailed description, given with reference to the appended drawings, provided by way of non-limiting example, in which:

FIG. 1 is a plan view of a panelling machine comprising a bending press and a manipulator robot, FIG. 2 is a side elevational view showing only the manipulator robot, FIG. 3 is a partial section taken in the vertical plane indicated III—III in FIG. 2, on an enlarged scale, FIG. 4 is a section taken in the horizontal plane IV of FIG. 3, FIG. 5 is a view of a Cyclo reduction unit, taken from the Dizionario d'Ingegneria (Dictionary of Engineering), Unione Tipografico-Editrice Torinese, Turin 1977, Vol IX, page 969, FIG. 6 is a partially-sectioned, partial side view showing the region indicated VI in FIG. 3, on an enlarged scale, FIG. 7 is a partial section taken in the plane indicated VII in FIG. 6, FIG. 8 is a partially-sectioned side view of the region indicated VIII in FIG. 7.

With reference to FIG. 1, a panelling machine comprises a bending press P and a manipulator robot R.

The manipulator robot R comprises a telescopic arm 10 which can swing about a vertical axis A.

At the end of the telescopic arm 10 there is a working head 12 which, in the embodiment in question, is in the form of an elongate gripping head provided with suction cups for the manipulation of sheet-metal panels.

The robot R is used for picking up the individual sheet-metal panels to be bent, from a supply station S1, by means of its suction-cup head 12, presenting them to the press P for the execution of one or more bends on one or more sides of the panels, along the bending line L, and then depositing the bent panels vertically in an output station S2.

For the reason which will be explained below, the arm 10 can pivot about its vertical axis A through an angle α of less than 360°, for example, an angle α of the order of 280°.

Although, for structural reasons, the pivoting is limited to the angle α, this limitation is advantageous since the arm cannot pass through an arc β within which there is a region, indicated S3, for an operator for the machine.

In the region S3, there is a control console NC, from which the operator can program the working cycles of the machine, that is, of the press P and of the robot R.

By virtue of the telescopic nature of the arm 10, the head 12 can occupy any desired radial position between a larger swinging radius r1 and a smaller swinging radius r2.

By way of example, the radius r1 may be of the order of 3 m and the radius r2 may be of the order of 1.7 m.

Several stores which may contain various tools of the press P are schematically indicated M.

For example, in the case of a bending press in which the upper blank-holder is in sections, the stores M may contain a whole assortment of sections, including shoe-shaped end sections of various types.

The robot R can advantageously change the tools with the use of a suitable working head fitted instead of the manipulator head 12.

With reference to FIG. 2, the telescopic arm 10 is supported by a hollow pillar 14 rotatable about the vertical axis A, as indicated by the double arrow F1.

The pillar 14 in turn is supported by a fixed base 16.

A hollow portion 18 of the arm 10 is mounted on the top of the pillar 14 so as to be able to pivot about a horizontal axis B, as indicated by the double arrow F2.

A movable portion 20 is slidable telescopically in the hollow portion 18, as indicated by the double arrow F3.

The arm 10 is moved about the horizontal axis B by a numerically-controlled electric motor 22, by means of a threaded-shaft transmission the shaft of which is indicated 24.

The distribution of the weight in the various portions of the arm 10 is such that the arm 10 is always urged by gravity to be inclined downwardly at its free end (on the left-hand side in FIG. 2) so as to cancel out all of the play in the transmission which comprises the threaded shaft 24.

The telescopic movements of the portion 20 are brought about by a numerically-controlled motor 26, by means of a threaded-shaft transmission, not shown in detail.

At its free end, the movable portion 20 of the arm 10 carries a first element 28 rotatable about a substantially horizontal axis C by means of a numerically-controlled electric motor 30, as indicated by the double arrow F4.

The first element 28 in turn supports a second element 32 pivotable about a horizontal axis D, as indicated by the double arrow F5.

The angular pivoting of the second element 32 is brought about by a numerically-controlled electric motor 34 and by means of a threaded-shaft transmission, the shaft of which is indicated 35.

The head 12 is mounted for rotation, as indicated by the double arrow F6, on a free end of the second element 32.

The axis of rotation of the head 12 is indicated E.

The head 12, which can rotate through 360° about the axis E, is rotated by a numerically-controlled electric motor 36 and reduction gearing (not shown).

The system for the rotation and angular positioning of the head 12 is described and illustrated in a PCT patent application for "A device for detecting the angular position of a rotary member, particularly a member of a manipular robot, and a robot incorporating the device" filed by the Applicant on the same date.

Reference will now be made to FIGS. 3 and 4 to describe the structure for supporting and rotating the hollow pillar 14 about the vertical axis A.

An annular plate 38 fixed to the base 16 in turn carries the fixed ring of a radial-axial bearing 40.

A fixed structure 42 which is substantially C-shaped in cross-section is superimposed on the annular plate 38.

The fixed structure 42 comprises a lower annular-plate-like portion 44 constituting the lower arm of the C-shape, which is fixed to the annular plate 38 and clamps the fixed ring of the bearing 40 from above.

A massive yoke 46 extends upwardly on one side of the plate-like portion 44 and a substantially annular plate-like portion 48 constituting the upper arm of the C-shape extends therefrom over, and a certain distance above, the plate-like portion 44.

The hollow pillar 14 is supported by a rotatable platform 50.

The rotatable platform 50 comprises an annular peripheral portion 52 which bears on the movable ring of the bearing 40 and is restrained thereon by means of a lower clamping ring 54 which in turn is restrained by an annular series of clamping screws 56.

A coplanar, radially internal spoke 58 forming part of the platform 50 is fitted in the space between the two, lower and upper, annular portions 44 and 48 of the C-shaped structure 42.

The spoke 58 has an annular end portion 60 constituting an attachment flange concentric with the vertical axis A.

The function of the flange 60 will be explained further below.

The fixed structure 42 supports a mechanical transmission constituted by a pair of reduction units, both of the planetary type, the internal gearing of which is described further below with reference to FIG. 5.

A first, main reduction unit is generally indicated 62 and a second, secondary reduction unit is generally indicated 64.

In particular, each reduction unit 62, 64 comprises: a driving member fixed angularly to a central shaft 66 common to both reduction units 62, 64; a driven member to which a respective hub or shaft 68, 70 is fixed; a respective peripheral ring 72, 74; an internal gearing which will be described with reference to FIG. 5.

The ring 74 of the secondary reduction unit 64 is fixed rigidly to the lower portion 44 of the fixed structure 42 from below by means of an annular series of screws 76.

The ring 72 of the main reduction unit 62 is fitted in a cylindrical seat 78 formed in the upper face of the upper portion 48 of the fixed structure 42.

A support 80 which is substantially Ω-shaped in diametral section is fitted on the ring 72 of the main reduction unit 62.

The support 80 comprises a lower flange 82 and an upper, annular wall 84.

The flange 82 is fixed directly to the upper portion 48 of the fixed structure 42 by means of an annular series of screws 86.

The screws 86 extend outside the ring 72 of the first reduction unit 62 without extending through it.

In use, the ring 72 is clamped in a pack between the flange 82 and the upper portion 48 of the fixed structure 42 by the tie rods constituted by the screws 86, by virtue of the friction due to the tightening of the tie rods 86.

This feature will be referred to further below.

A numerically-controlled, reversible electric motor 88 has its casing fixed to the annular wall 84 and its shaft 90, which is centred on the axis A, is coupled to the central shaft 66 of the two reduction units 62, 64 by means of a sleeve coupling 92.

Irrespective of the type of internal gearing preferred for the two mechanical reduction units 62, 64, these inevitably have intrinsic angular play which may be translated into a greater or lesser angular error between the angular position of the shaft 50 of the motor 88 and the angular position of the pillar 14.

In a manipulator robot of the type in question, this play would be translated into an unacceptable inaccuracy in the positioning of the head 12 of FIGS. 1 and 2, or of another similar head.

According to the invention, the use of two reduction units such as those indicated 62 and 64, enables this angular play to be practically eliminated; during the assembly of the robot, before the screws or tie rods 86 are finally tightened and after the ring 74 of the secondary reduction unit 64 has finally been fixed to the support structure 42, the assembler rotates the ring 72 of the main reduction unit 62 in one direction or the other about the axis A until it reaches an angular position in which the play within the two reduction units 62, 64 cancel one another out.

At this point, the assembler simply has to tighten the tie rods 86 fully in order to clamp the ring 72 of the main reduction unit 62 relative to the fixed structure 42 by friction.

As will be understood, the presence of the yoke 46 is necessary in order to interconnect the two, lower and upper portions 44 and 48 of the fixed structure 42 as rigidly as possible.

The presence of the yoke 46 requires the flange 60 to be connected to the annular peripheral portion 52 of the rotatable platform 50 by means of the internal radial spoke 58.

This is the reason why the arm 10 of the robot R (FIG. 1) can pivot only through an angle α of less than 360°.

As already stated, however, the limitation of the angle of pivoting of the arm 10 is beneficial for accident-prevention purposes, since the arm 10 and its head 12 can never reach the region S3 of FIG. 1 where the operator is situated.

The limitation of the angle of pivoting of the arm 10 also advantageously enables the electrical and pneumatic connections between the base 16 and the various members of the arm 10 to be established without the use of rotary connection means.

The preferred structure of the two reduction units, that is, the main unit 62 and the secondary unit 64, will now be described with reference to FIG. 5.

These two reduction units do not differ structurally but only in their dimensions because the main reduction unit 62 is in fact the one which makes the greater contribution to the transmission of the power from the motor 88 to the arm 10, whereas the secondary reduction unit 64 basically has the function of a "reaction member" for the purposes of cancelling out the play by means of the angular adjustment of the ring 72 of the main reduction unit 62.

It is understood the two reduction units 62, 64 could have the same dimensions, or their dimensions could be exchanged.

Both reduction units 62, 64 are preferably of the Cyclo type described and illustrated in Vol IX, page 969 of the Dizionario d'Ingegneria (cited above), as shown in FIG. 5.

Suitable reduction units of this type are distributed in Europe by Sumitomo Cyclo Europe, Cyclostrasse 92, D-85229 Markt Indersdorf, Germany.

With reference again to the description from the Dizionario d'Ingegneria, the driving shaft 66 carries eccentrically one or more planetary gears 94 having teeth 96 with sides shaped along an epitrochoid arc, meshing with teeth of cylindrical rollers 98 of the respective ring 72 or 74 which constitutes a fixed gear. The driven shaft, constituted, in this case, by the hub 68 or 70, is driven by the gear 94 by means of roller pins 100 which are engaged in holes 102 formed in the fixed gear 94. The difference between the diameter of the holes 102 and the diameter of the pins 100 of the driven shaft 68 or 70 is equal to 2e, e being the eccentricity of the pin 100 of the planetary gear 94.

If the number of teeth of the planetary gear is $Z_1$ and the number of teeth of the fixed gear is $Z_2=Z_1+1$, the reduction ratio is $1/Z_1$.

For a manipulator robot arm having a maximum radius of extension $r_1$ (FIG. 1) of 3 m, it is possible advantageously to use two Cyclo reduction units with an external diameter of 270 mm for the main reduction unit 62 and an external diameter of 220 mm for the secondary reduction unit 64.

It has been found advantageous to use two reduction units having a reduction ratio equal to 1/179.

Numerically-controlled machines are designed, amongst other things, to achieve positioning with maximum accuracy.

In general, a numerical control system comprises, on the one hand, a stepping motor such as, for example, the motor 88 of FIG. 3 and, on the other hand, a position detector which serves to send the control system a feedback signal for the purposes of the angular positioning of the rotary member driven by the motor.

In rotary devices such as that considered, the preferred angular position detector is constituted by a rotary encoder.

In the prior art, rotary encoders were connected directly to the motor shaft.

In order to make maximum use of the accuracy of angular positioning achieved by two planetary reduction units as described above, it is advantageous to use a different arrangement of the respective rotary encoder, in combination with the pillar 14 of the manipulator robot.

This arrangement is described and claimed separately in the Applicant's above-mentioned PCT patent application of the same date.

The same arrangement will be described herein with reference to FIGS. 6 to 8 and claimed in combination with the mechanical reduction transmission with two planetary reduction units.

With reference first of all to FIGS. 6 and 7, a toothed ring 104 having a peripheral set of teeth 106 is fixed to the annular peripheral portion 52 of the base 50 of the pillar 14.

A support block 108 is fixed to a peripheral region of the fixed structure 42 and a forked bracket 110 in turn is fixed thereto.

A rocker-like pivoting lever 112 is mounted in the bracket 110 for pivoting on a vertical pin 114.

A small vertical shaft 118 is mounted in one arm 116 of the lever 112 and a sprocket 120 keyed thereto is kept meshed with the set of teeth 106.

An annular plate 122, supported in a position raised from the base 16 carries a sleeve-like support 124 on which a rotary encoder 126 with a vertical axis is fixed as an angular position sensor.

The shaft of the encoder 126 is connected to the small shaft 118 of the sprocket 120 by means of flexible couplings 128.

As will be understood, to favour accuracy, the encoder 126 detects the angular position of the pillar 14 directly and not that of the shaft of the motor 88 of FIG. 3.

In order further to increase the accuracy of the detection of the angular position, another arm 130 of the rocker-like lever 112 contains a sliding pin 132 which reacts against the block 108 under the force of resilient means constituted by a helical spring 134.

The spring 134 keeps the sprocket 120 in engagement with the set of teeth 106 without play, for even greater accuracy in the detection of the angular position of the pillar 14.

FIGS. 7 and 8 show a means for detecting a "zero" position of the pillar 14 and of the respective arm 10.

The "zero" position, which is input into the numerical control system as a basic datum, may correspond, for example, (FIG. 1) to the position in which the arm 10 is oriented perpendicular to the bend line L.

A bracket 136 fixed on one side of the fixed structure 42 in turn carries a position detector 138 in the form of a proximity switch the sensitive end of which faces the set of teeth 106 in close proximity thereto.

A blind radial hole 140 is formed between two teeth of the set of teeth 106 in the "zero" position.

The presence of the hole 140 in front of the switch 138 causes a change in the state of the switch and the transmission of a corresponding signal to the numerical control system, or the interruption of a signal.

What is claimed is:

1. A device for supporting and pivoting an arm (10) which can swing about a vertical axis (A) and has a working head (12) at a free end of the type comprising:
   a fixed structure (42),
   a hollow pillar (14) rotatable about the vertical axis (A) and supporting the arm (10),
   a reversible electric motor (88) having a casing fixed to the fixed structure (42) and an output shaft (90) concentric with the vertical axis (A), and
   a mechanical reduction transmission which interconnects the output shaft (90) of the motor (88) and the pillar (14) and includes a pair of reduction units (62, 64), characterized in that
- both reduction units (62, 64) of the mechanical transmission are of the planetary type, each with a driving member (94), a driven member (68, 70), a fixed peripheral ring (72, 74), and internal gearing,
- the driving members (94) of both reduction units (62, 64) are fixed angularly to the output shaft (90) of the motor (88),
- the driven members (68, 70) of both reduction units (62, 64) are fixed angularly to the pillar (14),
- when the device is in operation, the peripheral rings (72, 74) of both reduction units (62, 64) are fixed to the fixed structure (42),
- the angular position of at least one of the peripheral rings (72) is adjustable about the vertical axis (A) relative to the other ring (74) to enable the play in the internal gearing of the reduction units (62, 64) to be cancelled out,
- the hollow pillar (14) is fixed on a platform (50) mounted for rotating about the vertical axis (A) on the fixed structure (42),
- the fixed structure (42) is substantially C-shaped in cross-section with a lower plate-like portion (44) and an upper flange-like portion (48) interconnected by a lateral yoke (46),
- the platform (50) comprises an annular peripheral portion (52) and a spoke (58) extending radially inwardly with an end portion constituting a flange (60) centred on the vertical axis (A),
- the spoke (48) and its flange (60) are interposed between the two lower and upper portions (44, 48) of the fixed structure,
- the motor (88) is supported centrally in the hollow pillar (14) on the upper portion (48) of the fixed structure (42),
- the rings (72, 74) of the two reduction units (62, 64) are fixed to the upper and lower portions (48, 44) of the fixed structure (42), respectively, and
- the driven members (68, 70) of both reduction units (62, 64) are fixed to the flange-like end portion (60) of the platform (50).

2. A device according to claim 1, characterized in that the two reduction units (62, 64) are both of the Cyclo type.

3. A device according to claim 1, characterized in that:
- the motor (88) is supported on top of a support (80) with an Ω-shaped diametral section, having a lower peripheral flange (82),
- the ring (72) of one of the reduction units (62) is interposed between the lower flange (82) of the Ω-shaped support (80) and the flange-like upper portion (48) of the fixed structure (42), and
- the flange (82) of the support (80) is joined to the upper flange-like portion (48) of the fixed structure (42) by means of threaded clamping tie rods (86) which extend outside the ring (72) of the respective reduction unit (62), and the ring (72) is clamped between the flange (82) of the support (80) and the upper flange-like portion (48) of the fixed structure (42) by virtue of the friction due to the tightening of the tie rods (86).

4. A device according to claim 3, characterized in that, in an upper face of the upper flange-like portion (48) of the fixed structure (42), there is a cylindrical seat (78) in which the ring (72) of the respective reduction unit (62) is fitted for locating purposes.

5. A device according to claim 1, characterized in that the platform (50) has a set of peripheral teeth (106) and the fixed structure (42) carries an angular position detector in the form of a rotary encoder (126) with a sprocket (120) meshed with the set of teeth (106) of the platform (50).

6. A device according to claim 5, characterized in that the encoder (126) is supported by the fixed structure (42) by means of a lever (112) pivoting about a fulcrum (114) the axis of which is parallel to the axis (A) of rotation of the pillar (14), and resilient means (134) are provided for urging the lever (112) in a direction such as to keep the sprocket (120) of the encoder (126) in engagement with the set of teeth (106) of the platform (50) without play.

7. A device according to claim 5, characterized in that it comprises a means for detecting a "zero" position of the pillar (14), the means being constituted by a proximity switch (138) having a sensitive end facing the set of teeth (106), and in that a hole (140), to the presence of which the proximity switch (138) is sensitive, is formed between two teeth of the set of teeth (106).

8. A manipulator robot including the device according to claim 1.

* * * * *